(12) United States Patent
Lin

(10) Patent No.: US 10,637,588 B1
(45) Date of Patent: Apr. 28, 2020

(54) METHOD FOR ELIMINATING ADJACENT CHANNEL INTERFERENCE AND SMALL BASE STATION

(71) Applicant: NANNING FUGUI PRECISION INDUSTRIAL CO., LTD., Nanning (CN)

(72) Inventor: Cho-Han Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/435,983

(22) Filed: Jun. 10, 2019

(51) Int. Cl.
| | |
|---|---|
| H04B 17/345 | (2015.01) |
| H04B 15/00 | (2006.01) |
| H04B 17/318 | (2015.01) |
| H04W 16/32 | (2009.01) |
| H04B 17/373 | (2015.01) |

(52) U.S. Cl.
CPC .......... H04B 15/00 (2013.01); H04B 17/318 (2015.01); H04B 17/373 (2015.01); H04W 16/32 (2013.01)

(58) Field of Classification Search
CPC .... H04B 15/00; H04B 17/318; H04B 17/373; H04B 1/10; H04B 1/1027; H04B 2001/1045; H04B 17/345; H04W 16/32; H04W 40/18; H04W 52/243; H04W 52/244; H04W 28/0236; H04W 40/16
See application file for complete search history.

(56) References Cited

U.S. PATENT DOCUMENTS

| | | | | |
|---|---|---|---|---|
| 2014/0003273 | A1* | 1/2014 | Dimou | H04W 24/02 370/252 |
| 2014/0254537 | A1* | 9/2014 | Kim | H04W 52/243 370/329 |
| 2014/0313914 | A1* | 10/2014 | Ling | H04W 24/02 370/252 |
| 2016/0105857 | A1* | 4/2016 | Takeda | H04W 52/243 370/329 |
| 2016/0198475 | A1* | 7/2016 | Uchiyama | H04W 52/38 370/329 |
| 2017/0195028 | A1* | 7/2017 | Shimezawa | H04W 24/10 |
| 2017/0245179 | A1* | 8/2017 | Callard | H04W 24/04 |
| 2019/0281599 | A1* | 9/2019 | Kim | H04W 72/0413 |

* cited by examiner

*Primary Examiner* — Andrew Wendell
(74) *Attorney, Agent, or Firm* — ScienBiziP, P.C.

(57) ABSTRACT

A method for eliminating interference between adjacent channels to avoid service disconnection in a backhaul line uses a small base station. The small base station acquires power level of a first signal received by a wireless backhaul line and transmitted from a macro base station in a preset period, and predicts the power of a second signal in a next preset period based on the measured power of the first signal. The small base station further determines whether the power of the first signal is more than a preset power threshold when the power of the first signal is less than the predicted power of the second signal. The small base station reduces the number of resource blocks being used when the power of the first signal is more than the preset power threshold.

20 Claims, 7 Drawing Sheets

| Resource blocks | Preset power threshold |
|---|---|
| First number range of the resource block | First power preset threshold |
| Second number range of the resource block | Second preset power threshold |
| Third preset power threshold | Third preset power threshold |

METHOD FOR ELIMINATING ADJACENT CHANNEL INTERFERENCE AND SMALL BASE STATION

FIELD

The subject matter herein generally relates to a field of wireless communications.

BACKGROUND

Increasing number of base station antennas and limited space mean that there are often channel interference between adjacent frequency signals, which causes the problem of service disconnection in a backhaul line when a connection signal of the backhaul line is low strength.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
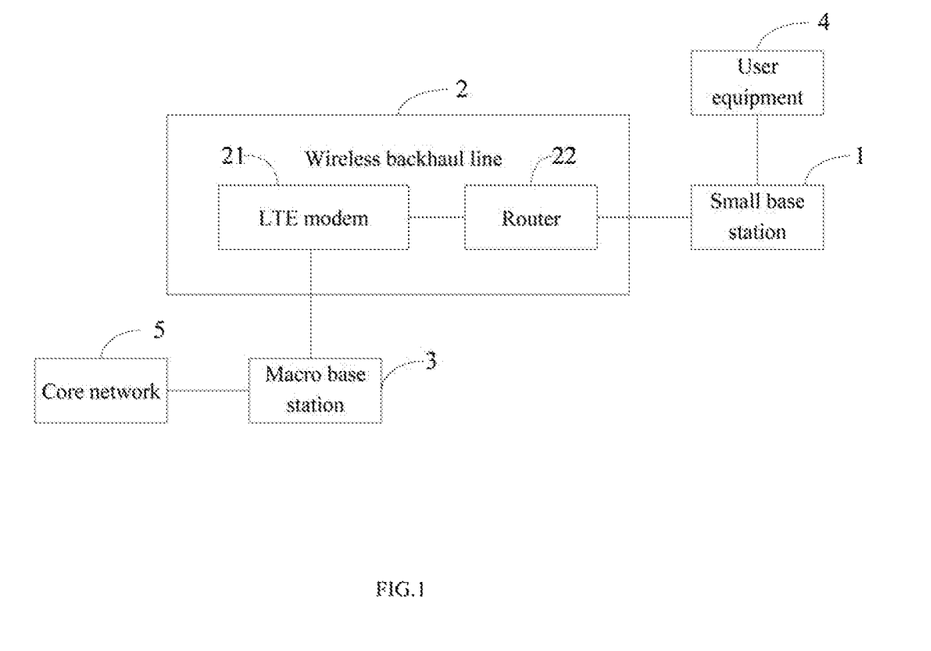
FIG. 1 is a block diagram of one embodiment of a running environment of a method for eliminating adjacent channel interference.

FIG. 1 illustrates a running environment and hardware background to which a method for eliminating adjacent channel interference is applied. The method is based in a small base station 1. The small base station 1 communicates with a macro base station 3 by a wireless backhaul line 2. The small base station 1 receives a wireless signal sent by a user equipment 4, and sends the received wireless signal to the macro base station 3 by the wireless backhaul line 2, and accesses to a core network 5 by the macro base station 3. In one embodiment, the small base station 1 can be a house- or building-based base station. The user equipment 4 can be an electronic device such as a mobile phone, a notebook computer, or a tablet computer. The core network 5 can be the internet. In one embodiment, the wireless backhaul line 2 includes an LTE modem 21 and a router 22. The LTE modem 21 is connected to the router 22. The small base station 1 is connected to the router 22, and the macro base station 3 is connected to the LTE modem 21. The small base station 1 can be connected to the macro base station 3 by the LTE modem 21 and the router 22.

In one embodiment, the small base station 1 receives a signal transmitted by the user equipment 4 and sends the received signal to the LTE modem 21 by the router 22. The LTE modem 21 modulates the signal from the router 22, and sends the modulated signal to the macro base station 3. The macro base station 3 sends the signal transmitted by the LTE modem 21 to the core network 5. Therefore, the user equipment 4 can access the core network 5 by the small base station 1, the wireless backhaul line 2, and the macro base station 3. In one embodiment, frequency band of a signal transmitted between the small base station 1 and the user equipment 4 is adjacent with a frequency band of a signal transmitted between the LTE modem 21 and the macro base station 3. Interference can be generated between the two signals, which interrupts communication between the small base station 1 and the macro base station 3.

Figure 2:
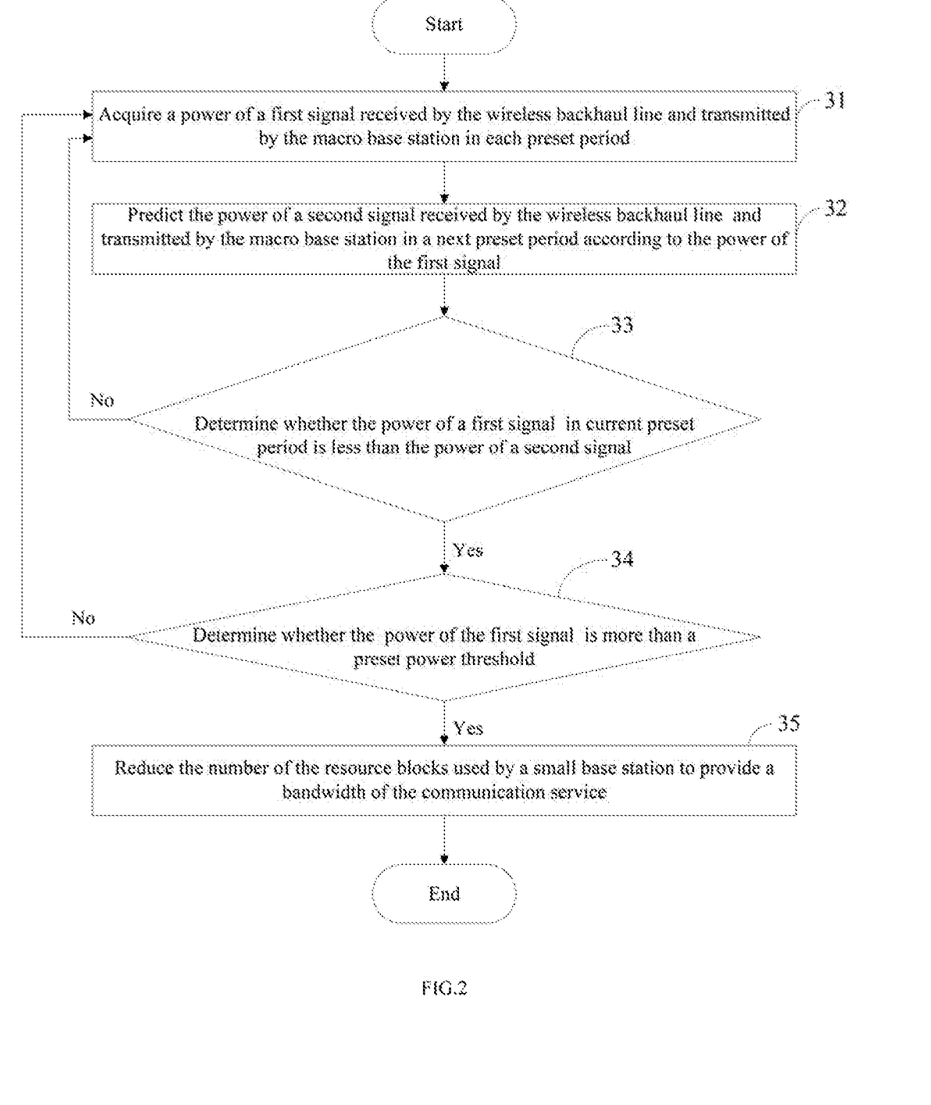
FIG. 2 is a flowchart of one embodiment of the method for eliminating adjacent channel interference.

FIG. 2 illustrates a flowchart of the method for eliminating adjacent channel interference. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 21.

At block 31, the small base station 1 acquires a power of a first signal received by the wireless backhaul line 2 and transmitted by the macro base station 3 in each preset period.

In one embodiment, the wireless backhaul line 2 is mounted on a circuit board of the small base station 1 and the LTE modem 21 is electronically connected to the small base station 3. The wireless backhaul line 2 samples the power of the first signal received by the LTE modem 21 of the wireless backhaul line 2 and transmitted by the macro base station 3 in each preset period, and the small base station 1 acquires the power of a first signal received by the wireless backhaul line 2. In one embodiment, the preset period can be determined according to actual needs, and the present disclosure does not limit the preset period.

At block 32, the small base station 1 predicts the power of a second signal received by the wireless backhaul line 2 and transmitted by the macro base station 3 in a next preset period according to the power of the first signal.

In one embodiment, the small base station 1 predicts the power of the second signal according to the power of the first signal by using a simple moving average algorithm. In detail, the small base station 1 calculates and predicts the power of the second signal received by the wireless backhaul line 2 and transmitted by the macro base station 3 in a next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

wherein, $S_t^{(1)}$ is a moving average of the tth preset period, $y_t$ is the power of the signal transmitted by the macro base station 3 and received by the wireless backhaul line 2 in the tth preset period, and N is a number of moving average items. In one embodiment, the value of N may be determined according to a short-term or long-term change requirement of the signal transmitted by the macro base station 3 and received by the wireless backhaul line 2.

At block 33, the small base station 1 determines whether a power of a first signal transmitted by the macro base station 3 and received by the wireless backhaul line 2 in current preset period is less than the power of a second signal transmitted by the macro base station 3 and received by the wireless backhaul line 2 in a next preset period. In one embodiment, when the power of the second signal transmitted by the macro base station 3 and received by the wireless backhaul line 2 in next preset period is less than the power of the first signal transmitted by the macro base station 3 and received by the wireless backhaul line 2 in current preset period, the small base station 1 performs step 34, otherwise small base station 1 performs step 31.

At block 34, the small base station 1 measures and determines whether the power of the first signal transmitted by the macro base station 3 and received by the wireless backhaul line 2 in current preset period is more than a preset power threshold. In one embodiment, when the small base station 1 determines that the power of the first signal transmitted by the macro base station 3 and received by the wireless backhaul line 2 in current preset period is more than a preset power threshold, the small base station 1 performs step 35, otherwise small base station 1 performs step 31.

Figure 3:
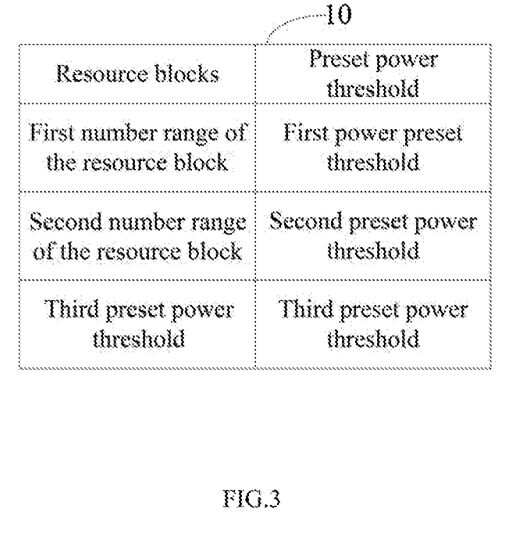
FIG. 3 is a schematic diagram of one embodiment of a power threshold relationship table.

In one embodiment, the small base station 1 stores a power threshold relationship table 10. FIG. 3 illustrates the power threshold relationship table 10. The power threshold relationship table 10 stores a correspondence between a number of preset power thresholds and a number of resource blocks used by the small base station 1 to provide a bandwidth of a communication service. In one embodiment, the step S24 "the small base station 1 measures and determines whether the power of the first signal transmitted by the macro base station 3 and received by the wireless backhaul line 2 in current preset period is more than a preset power threshold" includes:

a) acquiring the number of the resource blocks used by the small base station 1 to provide the bandwidth of the communication service;

b) determining the preset power threshold corresponding to the number of the acquired resource blocks by searching the power threshold relationship table 10; and c) determining whether the power of the first signal transmitted by the macro base station 3 and received by the wireless backhaul line 2 in current preset period is more than the determined preset power threshold.

Specifically, in the power threshold relationship table 10, the preset power threshold includes a first power preset threshold, a second preset power threshold, and a third preset power threshold. The first preset power threshold corresponds to a first number range of the resource block, the second preset power threshold corresponds a second number range of the resource block, and the third preset power threshold corresponds to a third number range of the resource block. For example, when the number of the resource blocks used by the small base station 1 to provide the bandwidth of the communication service is in the first number range of the resource block, the small base station 1 searches power threshold relationship table 10 to determine the first preset power, and determines whether the power of the first signal transmitted by the macro base station 3 and received by the wireless backhaul line 2 in current preset period is more than the first preset power.

At block 35, the small base station 1 reduces the number of the resource blocks used by the small base station 1 to provide a bandwidth of the communication service.

In one embodiment, when the power of the first signal transmitted by the macro base station 3 and received by the wireless backhaul line 2 in current preset period is more than the first preset power, the small base station 1 controls a media access control layer of the small base station 1 to reduce the number of the resource blocks used by the small base station 1 to provide the bandwidth of the communication service. Thereby, the interference between the signal transmitted between the small base station 1 and the user equipment 4 and the signal transmitted between the LTE modem 21 and the macro base station 3 is reduced or eliminated, and communication provided by the small base station 1 is maintained at a stable level.

The preset power threshold in one embodiment is related to the number of the resource blocks used by the small base station 1 to provide the bandwidth of the communication service. Thus, the greater the number of the resource blocks provided by the small base station, the greater will be the capability for interference generated by the small base station 1. In one embodiment, the small base station 1 determines the preset power threshold according to the number of the resource blocks used by the small base station 1 to provide the bandwidth of the communication service, and reduces the number of the resource blocks used by the small base station 1 to provide the bandwidth of the communication service when the power of the first signal transmitted by the macro base station 3 and received by the wireless backhaul line 2 in current preset period is more than the first preset power. Thus, the small base station 1 can improve the data transmission rate of the communication service and ensure the stability of the communication service.

Figure 4:
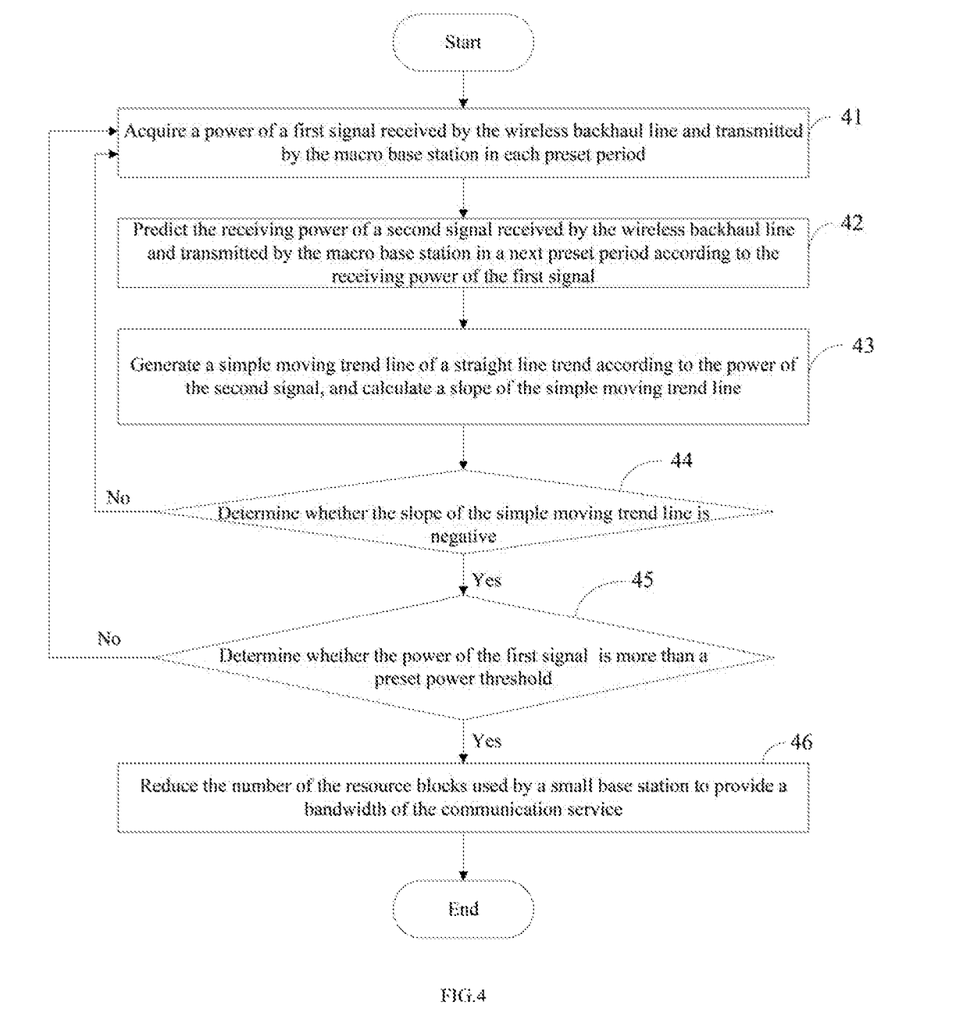
FIG. 4 is a flowchart of another embodiment of a method for eliminating adjacent channel interference.

FIG. 4 illustrates flowchart of another method for eliminating adjacent channel interference. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 41.

At block 41, the small base station 1 acquires a power of a first signal received by the wireless backhaul line 2 and transmitted by the macro base station 3 in each preset period.

At block 42, the small base station 1 predicts the power of a second signal received by the wireless backhaul line 2 and transmitted by the macro base station 3 in a next preset period according to the power of the first signal.

In one embodiment, the small base station 1 predicts the power of the second signal by using the simple moving average algorithm. In detail, the small base station 1 calculates and predicts the power of the second signal received by the wireless backhaul line 2 and transmitted by the macro base station 3 in a next preset period according to the formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

t≥N, wherein, $S_t^{(1)}$ is a moving average of the tth preset period, $y_t$ is the power of the signal transmitted by the macro base station 3 and received by the wireless backhaul line 2 in the tth preset period, and N is a number of moving average items. In one embodiment, the value of N may be determined according to a short-term or long-term change requirement of the signal transmitted by the macro base station 3 and received by the wireless backhaul line 2.

At block 43, the small base station 1 generates a simple moving trend line of a straight line trend according to the power of the second signal received by the wireless backhaul line 2 and transmitted by the macro base station 3 in the next preset period. herein, a slope of the simple moving trend line is calculated.

In one embodiment, the small base station 1 generates the simple moving trend line of the straight line trend according to the power of the second signal by using the trend moving average algorithm. In detail, the small base station 1 generates the simple moving trend line according to the formula $x_{t+T} = a_t + b_t \cdot T$, wherein t is the current preset period, T is the number of periods from the current preset period to a predicted period, $a_t$ is an intercept of the simple moving trend line, and $b_t$ is a slope of the simple moving trend line. Herein, $$a_t = 2S_t^{(1)} - S_t^{(2)}, S_t^{(2)} = \frac{S_t^{(1)} + S_{t-1}^{(1)} + \Lambda + S_{t-N+1}^{(1)}}{N} = S_{t-1}^{(2)} + \frac{S_t^{(1)} - S_{t-N}^{(1)}}{N}.$$

At block 44, the small base station 1 determines whether the slope of the simple moving trend line is negative. In one embodiment, when the slope of the simple moving trend line is negative, the small base station 1 performs step 44, otherwise small base station 1 performs step 41.

At block 45, the small base station 1 determines whether the power of the first signal transmitted by the macro base station 3 and received by the wireless backhaul line 2 in current preset period is more than a preset power threshold. In one embodiment, when the small base station 1 determines that the power of the first signal in current preset period is more than the preset power threshold, the small base station 1 performs step S46, otherwise small base station 1 performs step 41.

In one embodiment, the step 45 "the small base station 1 determines whether the power of the first signal in current preset period is more than the preset power threshold" includes:

a) acquiring the number of the resource blocks used by the small base station 1 to provide the bandwidth of the communication service;

b) determining the preset power threshold corresponding to the number of the acquired resource blocks by searching the power threshold relationship table 10; and c) determining whether the power of the first signal transmitted by the macro base station 3 and received by the wireless backhaul line 2 in current preset period is more than the determined preset power threshold.

At block 46, the small base station 1 reduces the number of the resource blocks used by the small base station 1 to provide a bandwidth of the communication service.

In one embodiment, when the power of the first signal transmitted by the macro base station 3 and received by the wireless backhaul line 2 in current preset period is more than the first preset power, the small base station 1 control the media access control layer of the small base station 1 to reduce the number of the resource blocks used by the small base station 1 to provide the bandwidth of the communication service. Thereby, interference between the signal transmitted between the small base station 1 and the user equipment 4 and the signal transmitted between the LTE modem 21 and the macro base station 3 is reduced or eliminated, and the communication of the small base station 1 is maintained at a stable level.

Figure 5:
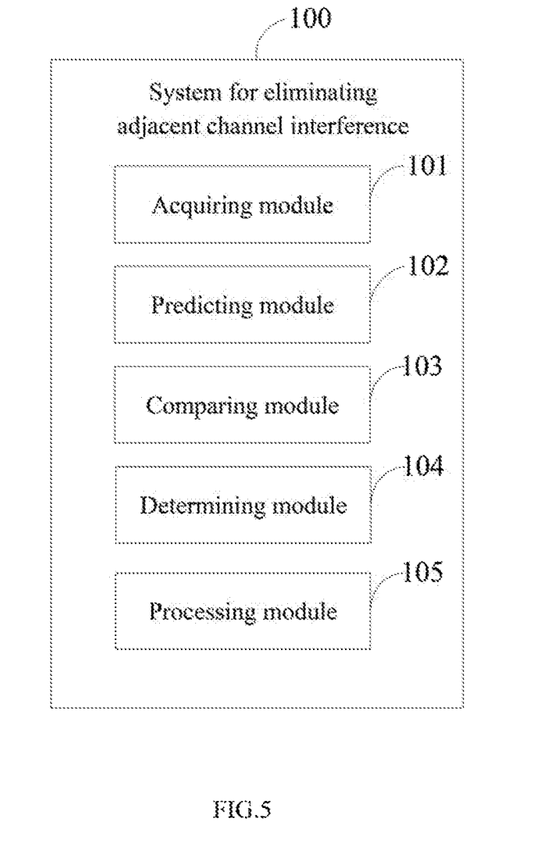
FIG. 5 is a block diagram of one embodiment of a system for eliminating adjacent channel interference.

FIG. 5 illustrates a system 100 for eliminating adjacent channel interference. In at least one exemplary embodiment, according to the functions it performs, the system 100 can be divided into a plurality of functional modules. The functional modules perform the steps 21-25 in the embodiment of FIG. 1 to perform the functions of eliminating adjacent channel interference. The system 100 includes, but is not limited to, an acquiring module 101, a predicting module 102, a comparing module 103, a determining module 104, and a processing module 105. The modules 101-105 of the system 100 can be collections of software instructions.

The acquiring module 101 acquires a power of a first signal received by the wireless backhaul line 2 and transmitted by the macro base station 3 in each preset period.

In one embodiment, the wireless backhaul line 2 is mounted on a circuit board of the small base station 1 and the LTE modem 21 is electronically connected to the small base station 3. The wireless backhaul line 2 samples the power of the first signal received by the LTE modem 21 of the wireless backhaul line 2 and transmitted by the macro base station 3 in each preset period, and the sampling module 101 acquires same. In one embodiment, the preset period can be determined according to actual needs, and the present disclosure does not limit the preset period.

The predicting module 102 predicts the power of a second signal received by the wireless backhaul line 2 and transmitted by the macro base station 3 in a next preset period based on the power of the first signal.

In one embodiment, the predicting module 102 predicts the power of the second signal by using a simple moving average algorithm. In detail, the predicting module 102 calculates and predicts the power of the second signal according to the formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

t≥N, wherein, $S_t^{(1)}$ is a moving average of the tth preset period, $y_t$ is the power of the signal transmitted by the macro base station 3 and received by the wireless backhaul line 2 in the tth preset period, and N is a number of moving average items. In one embodiment, the value of N may be determined according to a short-term or long-term change requirement of the signal transmitted by the macro base station 3 and received by the wireless backhaul line 2.

The comparing module 103 determines whether the power of the first signal in current preset period is less than the power of the second signal in next preset period.

The determining module 104 determines whether the power of the first signal in current preset period is more than a preset power threshold when the power of the second signal in next preset period is less than the power of the first signal.

In one embodiment, the small base station 1 stores the power threshold relationship table 10. The power threshold relationship table 10 stores a correspondence between a number of preset power thresholds and a number of resource blocks used by the small base station 1 to provide a bandwidth of a communication service. In one embodiment, the determining module 104 acquires the number of the resource blocks used by the small base station 1 to provide the bandwidth of the communication service, determines the preset power threshold corresponding to the number of the acquired resource blocks by searching the power threshold relationship table 10, and determines whether the power of the first signal in current preset period is more than the determined preset power threshold.

Specifically, in the power threshold relationship table 10, the preset power threshold includes a first power preset threshold, a second preset power threshold, and a third preset power threshold. The first preset power threshold corresponds to a first number range of the resource block, the second preset power threshold corresponds to a second number range of the resource block, and the third preset power threshold corresponds to a third number range of the resource block. For example, when the number of the resource blocks used by the small base station 1 to provide the bandwidth of the communication service is in the first number range of the resource block, the determining module 104 searches power threshold relationship table 10 to determine the first preset power, and determines whether the power of the first signal in current preset period is more than the first preset power.

The processing module 105 reduces the number of the resource blocks used by the small base station 1 to provide the bandwidth of the communication service when the power of the first signal in current preset period is more than a preset power threshold.

In one embodiment, when the power of the first signal is more than the first preset power, the small base station 1 control a media access control layer of the small base station 1 to reduce the number of the resource blocks used by the small base station 1 to provide the bandwidth of the communication service. Thereby, interference between the signal transmitted between the small base station 1 and the user equipment 4 and the signal transmitted between the LTE modem 21 and the macro base station 3 is reduced or eliminated, and the communication of the small base station 1 is maintained at a stable level.

The preset power threshold being related to the number of the resource blocks used by the small base station 1 means that the greater of number of resource blocks, the greater will be the tendency for adjacent-channel interference. In one embodiment, the small base station 1 determines the preset power threshold according to the number of the resource blocks used by the small base station 1, and reduces the number of the resource blocks when the power of the first signal in current preset period is more than the first preset power. Thus, the small base station 1 can improve the data transmission rate of the communication service and ensure the stability of the communication service.

Figure 6:
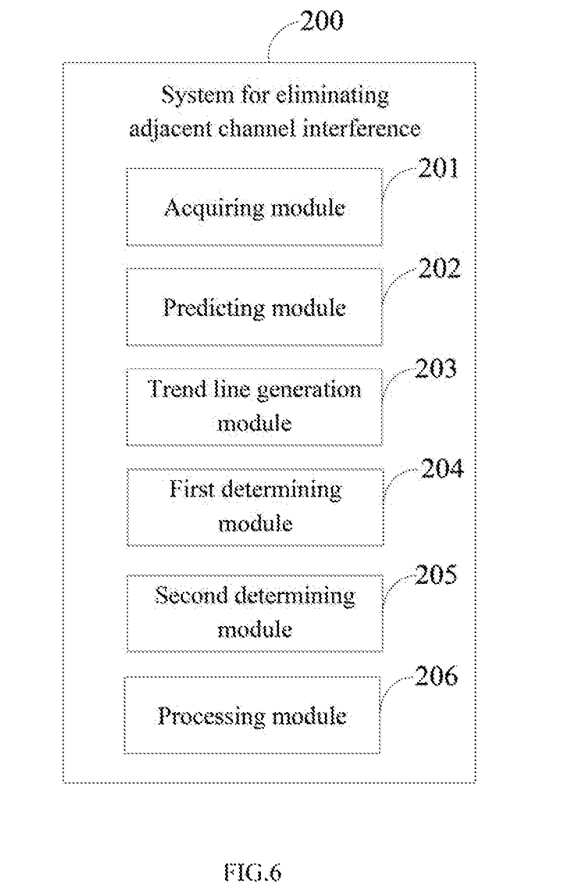
FIG. 6 is a block diagram of another embodiment of a system for eliminating adjacent channel interference.

FIG. 6 illustrates another system (system 200) for eliminating adjacent channel interference. In at least one exemplary embodiment, according to the functions it performs, the system 200 can be divided into a plurality of functional modules. The system 200 includes, but is not limited to, an acquiring module 201, a predicting module 202, a trend line generation module 203, a first determining module 204, a second determining module 205, and a processing module 206. The modules 201-106 of the system 200 can be collections of software instructions.

The acquiring module 201 acquires the power of the first signal received by the wireless backhaul line 2 and transmitted by the macro base station 3 in each preset period.

The predicting module 202 predicts the power of the second signal received by the wireless backhaul line 2 and transmitted by the macro base station 3 in a next preset period based on the power of the first signal.

In one embodiment, the predicting module 202 predicts the power of the second signal by using the simple moving average algorithm. In detail, the predicting module 202 calculates and predicts the power of the second signal in a next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

t≥N, wherein, $S_t^{(1)}$ is a moving average of the tth preset period, $y_t$ is the power of the signal transmitted by the macro base station 3 and received by the wireless backhaul line 2 in the tth preset period, and N is a number of moving average items. In one embodiment, the value of the N may be determined according to a short-term or long-term change requirement of the signal transmitted by the macro base station 3 and received by the wireless backhaul line 2.

The trend line generation module 203 generates a simple moving trend line of a straight line trend according to the actual power of the second signal received in the next preset period, and calculates a slope of the simple moving trend line.

In one embodiment, the trend line generation module 203 generates the simple moving trend line of the straight line trend by using the trend moving average algorithm. In detail, the trend line generation module 203 generates the simple moving trend line according to formula $x_{t+T}=a_t+b_t \cdot T$. In such formula, t is the current preset period, T is the number of periods from the current preset period to a predicted period, $a_t$ is an intercept of the simple moving trend line, and $b_t$ is a slope of the simple moving trend line, wherein, $$a_t = 2S_t^{(1)} - S_t^{(2)}, S_t^{(2)} = \frac{S_t^{(1)} + S_{t-1}^{(1)} + \Lambda + S_{t-N+1}^{(1)}}{N} = S_{t-1}^{(2)} + \frac{S_t^{(1)} - S_{t-N}^{(1)}}{N}.$$

The first determining module 204 determines whether the slope of the simple moving trend line is negative.

The second determining module 205 determines whether the power of the first signal in current preset period is more than the preset power threshold when the slope of the simple moving trend line is negative.

Specifically, the second determining module 205 acquires the number of the resource blocks used by the small base station 1, determines the preset power threshold corresponding to the number of the acquired resource blocks by searching the power threshold relationship table 10, and determines whether the power of the first signal in current preset period is more than the determined preset power threshold.

The processing module 206 reduces the number of the resource blocks used by the small base station 1 when the power of the first signal in current preset period is more than a preset power threshold.

In one embodiment, when the power of the first signal in current preset period is more than the first preset power, the processing module 206 controls the media access control layer of the small base station 1 to reduce the number of the resource blocks used by the small base station 1. Thereby, the interference between the signal transmitted between the small base station 1 and the user equipment 4 and the signal transmitted between the LTE modem 21 and the macro base station 3 is reduced or eliminated, and the communication of the small base station 1 is maintained at a stable level.

Figure 7:
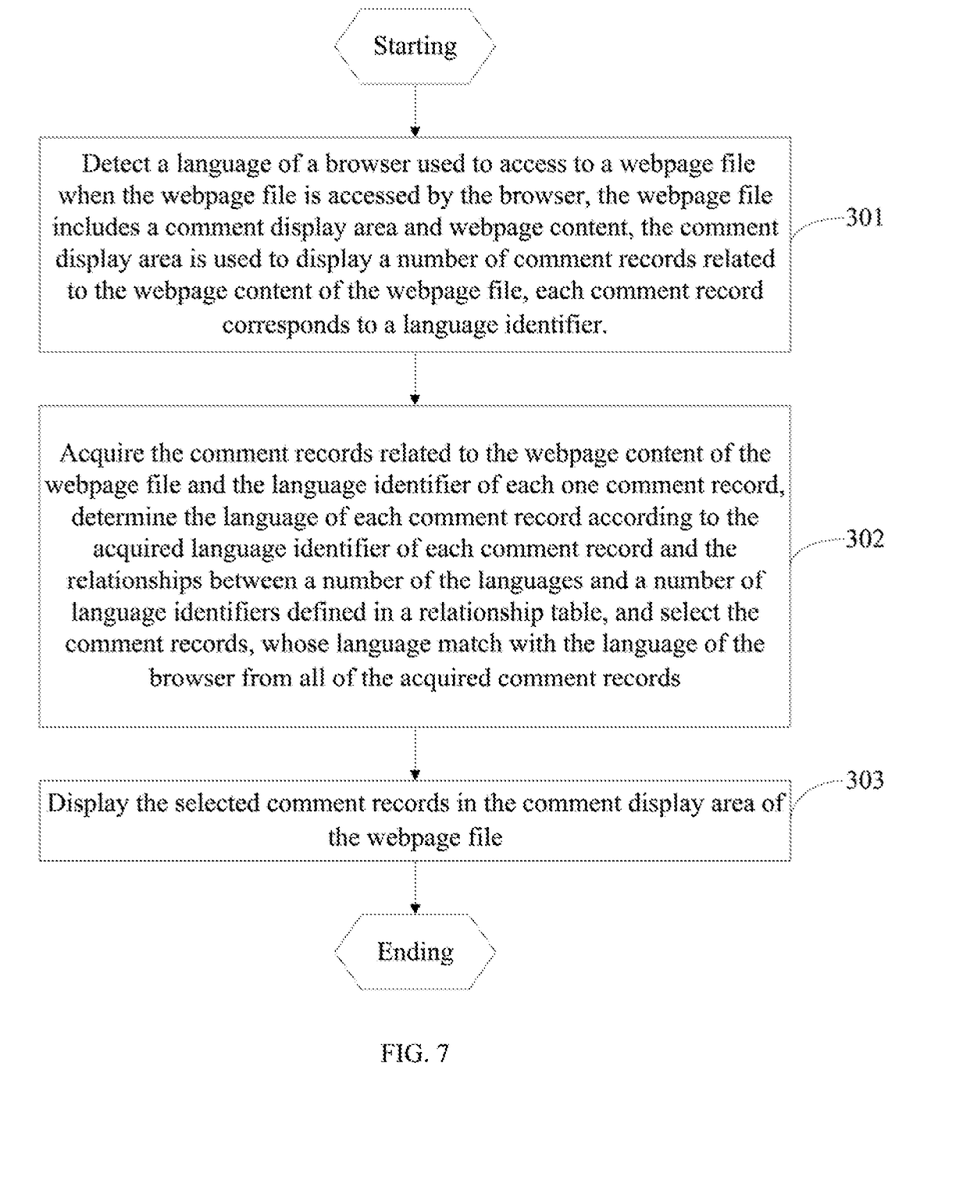
FIG. 7 is a schematic diagram of one embodiment of a small base station in the running environment of FIG. 1.

FIG. 7 illustrates the small base station 11. The small base station 1 includes a storage 11, a processor 12, and a computer program 13 stored in the storage 11 and executed by the processor 12. When the processor 12 executes the computer program 13, the steps in the embodiment of the method for eliminating adjacent channel interference is implemented, for example, steps 21 to 25 as shown in FIG. 2 or steps 41 to 46 as shown in FIG. 6. Alternatively, when the processor 12 executes the computer program 13, the functions of the modules in the embodiment of the system for eliminating adjacent channel interference are implemented, for example, modules 101-105 shown in FIG. 5, or modules 201-206 in FIG. 6.

In one embodiment, the computer program 13 can be partitioned into one or more modules/units that are stored in the memory 11 and executed by the processor 12. The one or more modules/units may be a series of computer program instruction segments capable of performing a particular function, and the instruction segments describe the execution of the computer program 12 in the small base station 1. For example, the computer program 13 can be divided into the acquiring module 101, the predicting module 102, the comparing module 103, the determining module 104, and the processing module 105 as shown in FIG. 5. Alternatively, the computer program 13 can be divided into the acquiring module 201, the predicting module 202, the trend line generation module 203, the first determining module 204, the second determining module 205, and the processing module 206 as shown in FIG. 6.

FIG. 7 shows only an example of the small base station 1, no limitations of the small base station 1 are constituted, and other examples may include more or less components than those illustrated, or some components combined, or a different arrangement. The components, such as the small base station 1, may also include input devices, output devices, communication unit, network access devices, buses, and the like.

The processor 12 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The general purpose processor may be a microprocessor or the processor may be any conventional processor or the like. The processor 12 is the control center of the small base station 1, and connects the entire small base station 1 by using various interfaces and lines.

The storage 11 stores data and programs of the small base station 1. For example, the storage 11 can store the system 100 for eliminating adjacent channel interference, preset face images, and preset voices. In at least one exemplary embodiment, the storage 11 can include various types of non-transitory computer-readable storage mediums. For example, the storage 11 can be an internal storage system for eliminating adjacent channel interference, such as a flash memory, a random access memory for temporary storage of information, and/or a read-only memory for permanent storage of information. The storage 11 can also be an external storage system, such as a hard disk, a storage card, or a data storage medium.

In one embodiment, the modules/units integrated in the small base station 1 can be stored in a computer readable storage medium if such modules/units are implemented in the form of a product. Thus the present disclosure may be implemented and realized in any or part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file or some intermediate form. The computer readable medium may include any entity or device capable of carrying the computer program code, a recording medium, a USB flash drive, a removable hard disk, a magnetic disk, an optical disk, a computer memory, a rad-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A small base station comprising:
   a processor; and
   a non-transitory storage medium coupled to the processor and configured to store a plurality of instructions, which cause the mall base station to:
   acquire a power of a first signal received by a wireless backhaul line and transmitted from a macro base station in each preset period;
   predict the power of a second signal received by the wireless backhaul line and transmitted from the macro base station in a next preset period according to the power of the first signal;
   determine whether the power of the first signal transmitted by the macro base station and received by the wireless backhaul line in current preset period is less than the power of the second signal transmitted by the macro base station and received by the wireless backhaul line in the next preset period;

determine whether the power of the first signal is more than a preset power threshold when the power of the first signal is less than the power of the second signal; and reduce the number of the resource blocks used by the small base station to provide a bandwidth of the communication service when the power of the first signal is more than a preset power threshold.

2. The small base station as recited in claim 1, wherein the plurality of instructions are further configured to cause the small base station to:

predict the power of the second signal according to the power of the first signal by using a simple moving average algorithm.

3. The small base station as recited in claim 2, wherein the plurality of instructions are further configured to cause the small base station to:

calculate and predict the power of the second signal in the next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

wherein, $S_t^{(1)}$ is a moving average of the tth preset period, $y_t$ is the power of the signal transmitted by the macro base station and received by the wireless backhaul line in the tth preset period, and N is a moving average number of items.

4. The small base station as recited in claim 1, wherein the plurality of instructions are further configured to cause the small base station to:

acquire the number of the resource blocks used by the small base station to provide the bandwidth of the communication service;

determine the preset power threshold corresponding to the number of the acquired resource blocks by searching a power threshold relationship table, wherein the power threshold relationship table stores a correspondence between a number of preset power thresholds and a number of resource blocks; and determine whether the power of the first signal transmitted by the macro base station and received by the wireless backhaul line in current preset period is more than the determined preset power threshold.

5. The small base station as recited in claim 1, wherein the plurality of instructions are further configured to cause the small base station to:

control a media access control layer of the small base station to reduces the number of the resource blocks used by the small base station to provide the bandwidth of the communication service.

6. A small base station comprising:

a processor; and a non-transitory storage medium coupled to the processor and configured to store a plurality of instructions, which cause the mall base station to:

acquire a power of the first signal received by a wireless backhaul line and transmitted by a macro base station in each preset period;

predict a power of a second signal received by the wireless backhaul line and transmitted by the macro base station in a next preset period according to the power of the first signal;

generate a simple moving trend line of a straight line trend according to the power of the second signal in the next preset period, and calculate a slope of the simple moving trend line;

determine whether the slope of the simple moving trend line is negative;

determine whether the power of the first signal transmitted by the macro base station and received by the wireless backhaul line in current preset period is more than a preset power threshold when the slope of the simple moving trend line is negative; and reduce the number of the resource blocks used by the small base station to provide a bandwidth of the communication service when the power of the first signal is more than the preset power threshold.

7. The small base station as recited in claim 6, wherein the plurality of instructions are further configured to cause the small base station to:

predict the power of the second signal according to the power of the first signal by using a simple moving average algorithm.

8. The small base station as recited in claim 7, wherein the plurality of instructions are further configured to cause the small base station to:

calculate and predict the power of the second signal in the next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

wherein, $S_t^{(1)}$ is a moving average of the tth preset period, $y_t$ is the power of the signal transmitted by the macro base station and received by the wireless backhaul line in the tth preset period, and N is a number of moving average items.

9. The small base station as recited in claim 8, wherein the plurality of instructions are further configured to cause the small base station to:

generate the simple moving trend line according to formula $x_{t+T} = a_t + b_t \cdot T$, wherein t is current preset period, T is the number of periods from the current preset period to a predicted period, $a_t$ is an intercept of the simple moving trend line, and $b_t$ is a slope of the simple moving trend line, wherein, $$a_t = 2S_t^{(1)} - S_t^{(2)}, S_t^{(2)} = \frac{S_t^{(1)} + S_{t-1}^{(1)} + \Lambda + S_{t-N+1}^{(1)}}{N} = S_{t-1}^{(2)} + \frac{S_t^{(1)} - S_{t-N}^{(1)}}{N}.$$

10. The small base station as recited in claim 6, wherein the plurality of instructions are further configured to cause the small base station to:

control a media access control layer of the small base station to reduces the number of the resource blocks used by the small base station to provide the bandwidth of the communication service.

11. A method for eliminating adjacent channel interference comprising:

acquiring a power of a first signal received by a wireless backhaul line and transmitted from a macro base station in each preset period;

predicting the power of a second signal received by the wireless backhaul line and transmitted from the macro base station in a next preset period according to the power of the first signal;

determining whether the power of the first signal transmitted by the macro base station and received by the wireless backhaul line in current preset period is less than the power of the second signal transmitted by the macro base station and received by the wireless backhaul line in the next preset period;

determining whether the power of the first signal is more than a preset power threshold when the power of the first signal is less than the power of the second signal; and reducing the number of the resource blocks used by the small base station to provide a bandwidth of the communication service when the power of the first signal is more than a preset power threshold.

12. The method as recited in claim 11, further comprising:
predicting the power of the second signal according to the power of the first signal by using a simple moving average algorithm.

13. The method as recited in claim 12, further comprising:
calculating and predicting the power of the second signal in the next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

wherein, $S_t^{(1)}$ is a moving average of the tth preset period, $y_t$ is the power of the signal transmitted by the macro base station and received by the wireless backhaul line in the tth preset period, and N is a moving average number of items.

14. The method as recited in claim 11, further comprising:
acquiring the number of the resource blocks used by the small base station to provide the bandwidth of the communication service;

determining the preset power threshold corresponding to the number of the acquired resource blocks by searching a power threshold relationship table, wherein the power threshold relationship table stores a correspondence between a number of preset power thresholds and a number of resource blocks; and determining whether the power of the first signal transmitted by the macro base station and received by the wireless backhaul line in current preset period is more than the determined preset power threshold.

15. The method as recited in claim 11, further comprising:
controlling a media access control layer of the small base station to reduces the number of the resource blocks used by the small base station to provide the bandwidth of the communication service.

16. A method for eliminating adjacent channel interference comprising:
acquiring a power of the first signal received by a wireless backhaul line and transmitted by a macro base station in each preset period;

predicting a power of a second signal received by the wireless backhaul line and transmitted by the macro base station in a next preset period according to the power of the first signal;

generating a simple moving trend line of a straight line trend according to the power of the second signal in the next preset period, and calculating a slope of the simple moving trend line;

determining whether the slope of the simple moving trend line is negative;

determining whether the power of the first signal transmitted by the macro base station and received by the wireless backhaul line in current preset period is more than a preset power threshold when the slope of the simple moving trend line is negative; and reducing the number of the resource blocks used by the small base station to provide a bandwidth of the communication service when the power of the first signal is more than the preset power threshold.

17. The method as recited in claim 16, further comprising:
predicting the power of the second signal according to the power of the first signal by using a simple moving average algorithm.

18. The method as recited in claim 17, further comprising:
calculating and predicting the power of the second signal in the next preset period according to formula $$S_t^{(1)} = \frac{y_t + y_{t-1} + \Lambda + y_{t-N-1}}{N} = S_{t-1}^{(1)} + \frac{y_t - y_{t-N}}{N}, t \geq N,$$

wherein, $S_t^{(1)}$ is a moving average of the tth preset period, $y_t$ is the power of the signal transmitted by the macro base station and received by the wireless backhaul line in the tth preset period, and N is a number of moving average items.

19. The method as recited in claim 18, further comprising:
generating the simple moving trend line according to formula $x_{t+T} = a_t + b_t \cdot T$, wherein t is current preset period, T is the number of periods from the current preset period to a predicted period, $a_t$ is an intercept of the simple moving trend line, and $b_t$ is a slope of the simple moving trend line, wherein, $$a_t = 2S_t^{(1)} - S_t^{(2)}, S_t^{(2)} = \frac{S_t^{(1)} + S_{t-1}^{(1)} + \Lambda + S_{t-N+1}^{(1)}}{N} = S_{t-1}^{(2)} + \frac{S_t^{(1)} - S_{t-N}^{(1)}}{N}.$$

20. The method as recited in claim 16, further comprising:
controlling a media access control layer of the small base station to reduces the number of the resource blocks used by the small base station to provide the bandwidth of the communication service.

* * * * *